United States Patent [19]

Sturges, Jr.

[11] 4,316,189
[45] Feb. 16, 1982

[54] ELECTROMECHANICAL DISPLAY APPARATUS

[75] Inventor: Robert H. Sturges, Jr., Pittsburgh, Pa.

[73] Assignee: Westinghouse Electric Corp., Pittsburgh, Pa.

[21] Appl. No.: 147,800

[22] Filed: May 8, 1980

[51] Int. Cl.³ .......................... G09F 13/36; H04N 7/18
[52] U.S. Cl. .............................. 340/870.34; 356/154; 358/101
[58] Field of Search .......... 358/101; 340/319, 27 NA, 340/27 AT, 709, 723, 725, 729, 731, 747, 724, 198, 870.34; 40/436, 438; 356/154, 138, 142, 144, 147; 235/467

[56] References Cited

U.S. PATENT DOCUMENTS

| | | | |
|---|---|---|---|
| 3,195,410 | 7/1965 | Colten et al. | |
| 3,219,894 | 11/1965 | Rösch | |
| 3,532,807 | 10/1970 | Webb | 358/101 |
| 3,541,243 | 11/1970 | Whitsel | 358/101 |
| 3,600,556 | 8/1971 | Acker | 235/467 |
| 3,634,959 | 1/1972 | Goodrich | 340/27 NA |
| 3,643,018 | 2/1972 | Adler | 358/101 |
| 3,749,830 | 7/1973 | Blitchington | 358/101 |
| 3,783,189 | 1/1974 | Nelson | 358/101 |
| 3,790,704 | 2/1974 | Collomosse et al. | 358/101 |
| 3,814,845 | 6/1974 | Hurlbrink et al. | 358/101 |
| 3,899,634 | 8/1975 | Montone et al. | 358/101 |
| 3,903,363 | 9/1975 | Montone et al. | 358/101 |
| 3,988,535 | 10/1976 | Hickman et al. | 358/101 |
| 4,017,721 | 4/1977 | Michaud | |
| 4,021,840 | 5/1977 | Ellsworth et al. | 358/101 |
| 4,044,377 | 8/1977 | Bowerman | 358/101 |

Primary Examiner—Thomas A. Robinson
Attorney, Agent, or Firm—R. G. Brodahl

[57] ABSTRACT

A display apparatus provides a three-dimensional pictorial representation of the position of a movable first member in relation to a stationary second member for the purpose of remotely positioning the first member to enable docking with the second member.

6 Claims, 5 Drawing Figures

ELECTROMECHANICAL DISPLAY APPARATUS

CROSS-REFERENCE TO RELATED APPLICATION

The present application is related to the following patent application which is assigned to the same assignee and the disclosure of which is incorporated herein by reference: Ser. No. 939,555, filed Sept. 15, 1978 by R. H. Sturges and entitled, "Photoelectric Docking Device".

BACKGROUND OF THE INVENTION

This invention pertains generally to a display apparatus for a three-dimensional docking position control system and more particularly to a relative position representation image display apparatus for use with a remote manipulator. Remote manipulators are frequently employed in adverse environments to handle a variety of workpiece end effectors or tools. In the process of engaging one of these tools, the hand of the remote manipulator arm is moved up to the tool and accurately positioned so that a set of jaws or a clamp included with the hand can complete the attachment of the tool to the hand of the remote manipulator arm. Similarly, when a tool is released, it is often required that the arm withdraw along a precise path aligned with that tool to prevent bumping the tool or other adjacent objects. The required degree of three-dimensional precision accuracy with which this acquisition or docking operation is accomplished is related to the characteristics and relative stiffness of the manipulator arm and the tool acquired, and the amount of available clearance for the manipulator arm and the hand before the jaws are closed to engage the tool. To couple a manipulator arm successfully with a tool in a remote control system, it is necessary that the coupler first member on the manipulator arm and the tool holder second member be aligned very accurately. Before the operator shuts the coupler jaws, he must be sure that the coupler first member and the tool second member are at the correct spacing and in the same vertical and horizontal positions. If they are not, the jaws may damage the tool second member or even work loose and drop the tool if the grip is not secure.

During such an acquisition or coupling maneuver, the manipulator operator requires a high resolution feedback display of the jaw and the tool interface, especially when a high precision docking operation is required between a stiff manipulator arm and a rigid tool holder. Typical lighting conditions and the location of television cameras do not always allows adequate viewing of such an operation with the necessary depth perception capability for the relative positioning of the manipulator hand and associated workpiece tools in three-dimensional space. The coupling or docking operation can make use of a photoelectric docking sensor described in the above cross-referenced application Ser. No. 939,555, which sends out three voltage signals that indicate the difference in position along respective X, Y and Z axes between the coupler first member and the tool holder second member.

SUMMARY OF THE INVENTION

This invention provides an electromechanical display apparatus to show the relative positioning and provide the operator depth perception capabilities desired for controlling the remote coupling or docking of a first member relative to a second member. In accordance with this invention, electrical output signals representative of the relative position of the two members in three-dimensional space are supplied by a docking sensor to the present display apparatus, which then operates to provide an improved three-dimensional pictorial representation of the moving position of the first member with respect to the fixed position of the second member including the position of a moving image of the first member in relation to the position of a fixed image of the second member.

DESCRIPTION OF THE PREFERRED EMBODIMENT

Figure 1:
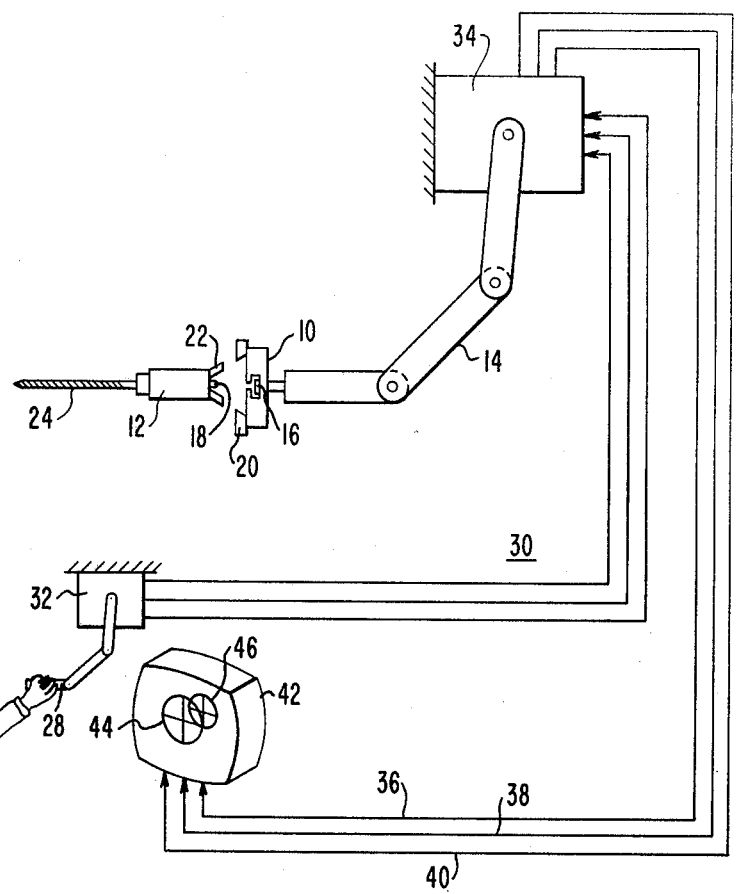
FIG. 1 shows a typical three-dimensional docking position control system including a display apparatus for the operator.

A typical three-dimensional docking position control system for operation with the display apparatus of this invention is illustrated in FIG. 1 and is generally useful for positioning and docking a movable first member 10 with respect to a fixed position second member 12. More particularly, there is included a positionally-controlled manipulator arm 14 having a first member clamping hand 10 for docking in relation to a second member end effector or tool holder 12. The manipulator arm 14 is illustrated equipped with a photoelectric position sensor 16 and the end effector 12 is shown carrying a point light source 18 such as described in the above cross-referenced and related application.

The purpose of the illustrated docking operation is to secure the second member 12 within the movable jaws 20 of the first member 10 by closing the jaws 20 against the slots 22 of the second member 12. In this manner, the manipulator arm 14 can pick up and retrieve a tool such as a drill 24, a file or the like included as part of the second member 12 and perform assigned tasks under the direction of a remote human operator 26. The human operator 26 functions to adjust the position of a control device 28 for determining the position of the first member 10 in relation to the fixed position of the tool second member 12. A conventional and well-known servo system 30 is included between the manipulator model 32 and the actual manipulator 34 that is performing the desired coupling or docking task. The operator 26 can operate the manipulator model 32 by manually positioning the control device 28, or by the use of a keyboard or manipulator controller as well known to persons skilled in this art, and this causes the manipulator first member 10 to positionally follow the manually effected three-dimensional positioning of the control device 28. The position sensor 16 as described in the cross-referenced application provides three position output signals 36, 38 and 40 representative of the cartesian coordinates for the respective X, Y and Z movement axes of the first member 10 in accordance with the resulting physical movement of the first member 10 in relation to the fixed position of the light source 18 as a docking reference point on the second member 12. These three respective axis position output signals 36, 38 and 40 are connected to the respective axis drives of the display apparatus 42. The display apparatus includes a fixed position first image 44 and a movable second image 46 to show any difference in position along these three axes between the coupler first member 10 and the tool second member 12.

The illustrative position sensor 16 shown in FIG. 1 can include an array of photo sensor zones which are formed from an arrangement of separate cells or from a continuous photo sensitive array that is divided into sections. A plurality of such sections or zones can develop the required X axis, Y axis and Z axis coordinate output position signals, as described in the above cross-referenced application Ser. No. 939,555, to operate with the respective axis drives of the present three-dimensional pictorial display apparatus.

The manipulator operator 26 initially positions the movable first member 10 in relation to the fixed second member 12 approximately by the usual and well-known means of feedback such as a closed circuit TV system, a master slave control or visually until the light source 18 is close enough to the position sensor 16 to generate suitable output position signals 36, 38 and 40. Then the operator 26 observes the position and size of the movable image 46 in relation to the fixed image 44 as the operator brings the jaws 20 of the first member 10 toward a desired docking location with the slots 22 of the second member 12. When the movable image 46 is centered on the screen of the display apparatus 42 and has a size substantially the same as the fixed image 44, the operator 26 can safely actuate the jaws 20 to close. An opening and removal of the jaws 20 from the slots 22 of the tool second member 12 is similarly done by keeping the movable image 46 concentric and in the center of the fixed image 44 as the movable image 46 grows smaller and out of range corresponding with the axial withdrawal movement of the first member 10 in relation to the fixed position of the second member 12.

Figure 2:
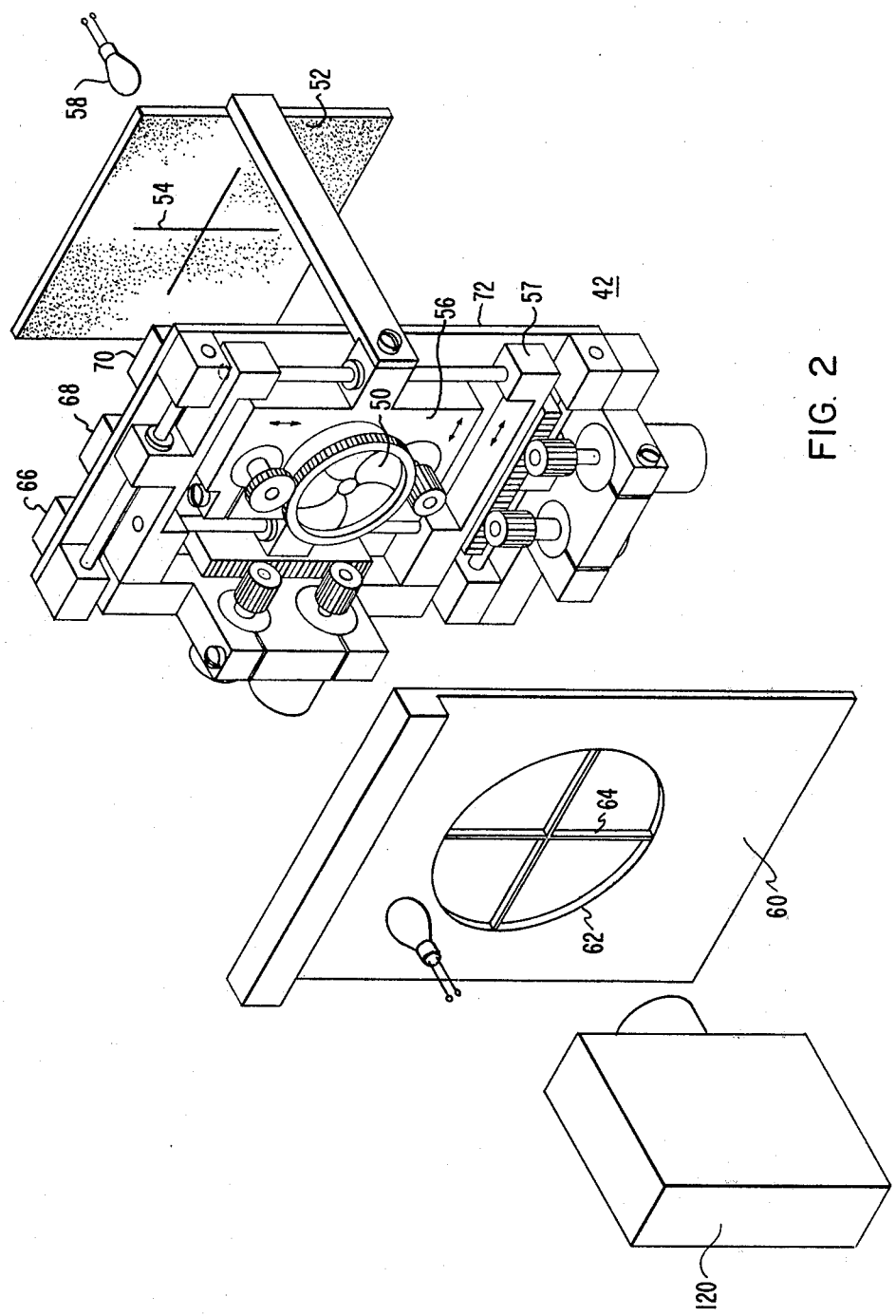
FIG. 2 shows an isometric view of the present display apparatus.

In FIG. 2, there is shown an isometric view of the display apparatus 42 including an adjustable iris member 50. Behind the iris member 50 there is a ground glass screen 52 with a reticule 54 or cross hair etched on the ground glass screen 52. The screen 52 is fastened to the movable carriage 56 supporting the iris member 50 and is lit from behind by a small lamp 58. In front of the iris member 50, there is a fixed position screen 60 having a circle 62 with a reticule 64 inscribed on the screen 60. The position sensor 16 shown in FIG. 1 measures the difference in position for each of the X, Y and Z axes, between the first member 10 on the manipulator arm 14 and the second member 12 including the tool 24. The sensor 16 transmits a position voltage signal to each of three motor and feedback potentiometer servo loops 66, 68 and 70 mounted on the fixed frame 72 supporting the movable carriage 56.

Figure 3:
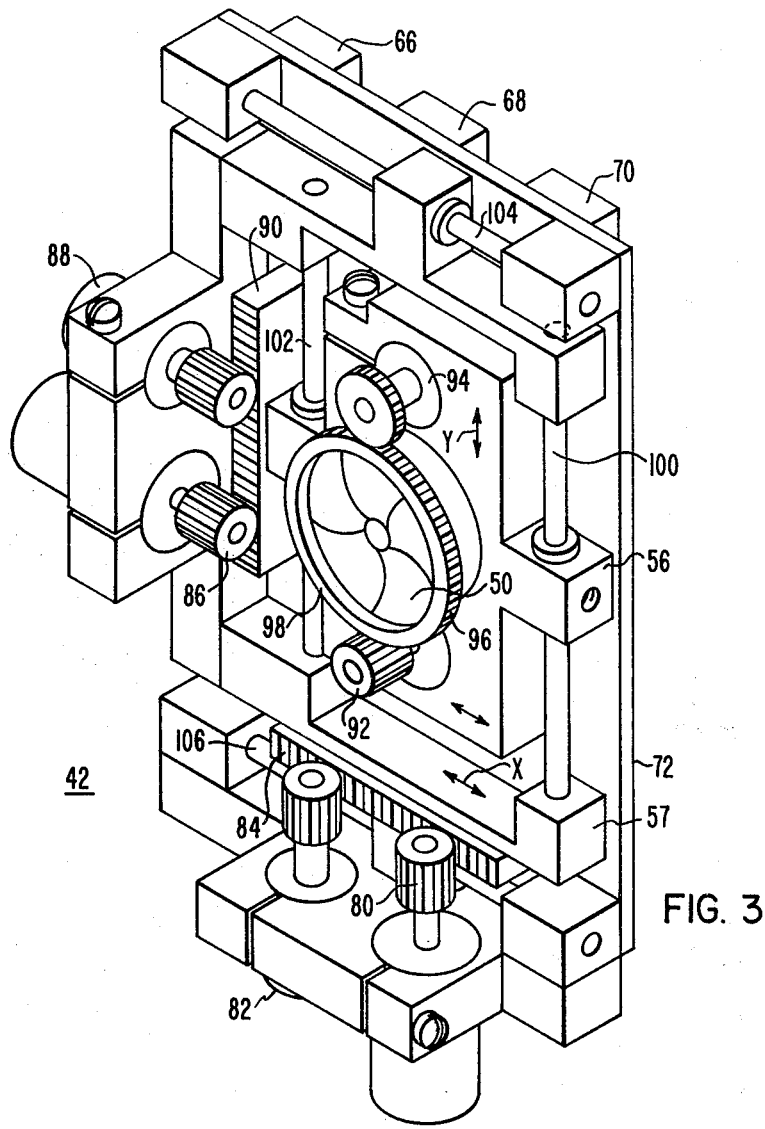
FIG. 3 shows the individual axis drives provided for the present display apparatus to provide a representative three-dimensional pictorial display.

In FIG. 3, there are shown the respective X, Y and Z axis drives provided for the present display apparatus. A motor driven gear 80 and a feedback potentiometer 82 are coupled with the frame 72 and are operative with a rack 84 fastened to the movable carriage member 57 for the X axis of horizontal movement of the carriage 56. A motor driven gear 86 and a feedback potentiometer 88 are coupled with the frame 72 and are operative with a rack 90 fastened to the movable carriage 56 for the Y axis of vertical movement of the carriage 56. A motor-driven gear 92 and a feedback potentiometer 94 are coupled with the movable carriage 56 and are operative with a rack 96 that surrounds the control ring 98 of the iris apparatus 50 for the Z axis of depth representation by changing the iris opening and thereby the relative size of the projected movable second image 46 on the fixed screen 60. Each of the provided X, Y and Z axis servo loops, respectively having a motor-driven gear and a feedback potentiometer, convert one of the positional electrical signals from the position sensor 16 into mechanical movement of the carriage 56 to correspond with and follow the position of the hand first member 10. The fixed frame 72 holds the movable carriage 56 to travel on rods 100 and 102 for the vertical movement and to travel on rods 104 and 106 for the horizontal movement of the carriage 56. A position signal from the sensor 16 for the X axis operates with the motor-driven gear 80 to move the carriage 56 in a horizontal direction, a position signal from the sensor 16 for the Y axis operates with the motor-driven gear 86 to move the carriage 56 in a vertical direction and a position signal from the sensor 16 for the Z axis operates with the motor-driven gear 92 to adjust the iris opening aperture to change the size of the movable second image 46 on the screen 60 in accordance with the separation distance between the first member 10 and the tool second member 12. Each of the signals is proportional to the difference in position between the clamp first member 10 and the tool second member 12 in relation to one of the X, Y and Z axes. The motor and pot for each axis is connected mechanically by means of the gear and rack so the angular position of the shafts of both the motor and the pot is proportional to the voltage signal. Through the associated gears and racks, the X axis and Y axis motors drive the carriage 56 through a distance that corresponds to the voltage signal for these respective axes. This moves the iris opening and the rear cross hairs on the rear screen 52 horizontally and vertically in relation to the fixed reticule on the front screen 60. The Z axis signal opens the aperture to a size that represents the separation distance between the coupler first member 10 and the tool second member 12.

Figure 4:
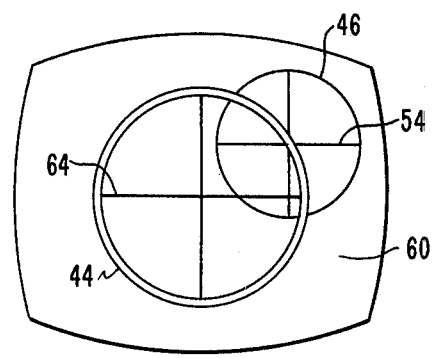
FIG. 4 shows the provided display apparatus including a moving image of the first member and a fixed image of the second member.

In FIG. 4, there is shown the moving image 46 representing the position of the first member 10 in relation to the fixed image 44 representing the position of the second member 12 and which both are visible to the operator 26 observing the front screen 60.

The position of the moving image 46 in relation to the position of the fixed image 44 illustrates the relative positions of the coupler first member 10 and the tool second member 12. On a viewing screen 60, as long as the coupler first member and the tool second member 12 are out of alignment and are not at the same depth, the screen 60 shows a large circle image 44 with an inscribed reticule 64 superimposed on a smaller circle image 46 having a reticule 54. As the operator 26 manipulates the arm 14, the smaller circle image 46 moves either vertically or horizontally in relation to the larger image 44. If the coupler first member 10 and the tool second member 12 are coming closer together, the small reticule image 46 will get larger. When the fixed image 44 and the movable image 46 coincide and are concentric in size and position, the operator 26 knows that the coupler first member 10 and the tool second member 12 are precisely aligned and in position for docking. The operator can close the coupler jaws 20 with confidence that a satisfactory coupling with the tool second member 12 will result.

The here-provided movement of the carriage 56 along each of the X and Y axes and the adjustment of the aperture of the iris member 50 to represent the Z axis separation distance between the coupler first member 10 and the tool second member 12 results in the visual moving of the image 46 on the ground glass screen 60 in relation to the fixed image 44 and changes the size of the movable image 46 on the screen 60. The smaller the size of the image 46, the operator 26 realizes thus represents a greater distance between the coupler first member 10 and the tool second member 12. If desired, these relative movements of the images 44 and 46 can be displayed on a remote TV monitor operative with a TV camera 120 shown in FIG. 2 that is set up in front of the screen 60 as well known to persons skilled in this art. The lens of the camera 120 can have an extended focal length so that it can cover about 75% of the vertical movement of the carriage 56 and the lens can also be stopped down so that the only thing the camera will show on the TV monitor is the fixed image 44 on the screen 60 superimposed on the movable image 46. The fixed screen 60 can be edge lighted and the movable screen 52 can be back-lighted if desired, as shown.

Figure 5:
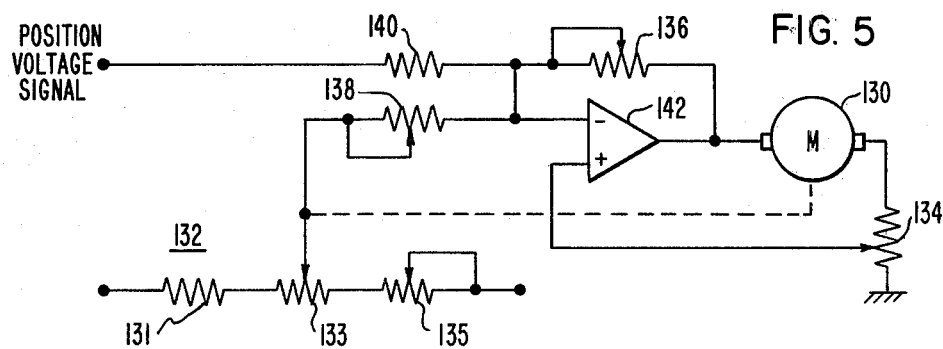
FIG. 5 illustrates a suitable servo drive loop for each axis drive of the present display apparatus.

In FIG. 5, there is illustrated a servo drive device that is suitable for each of the motor driven gear 80 for the X axis, the motor driven gear 86 for the Y axis and the motor driven gear 92 for the Z axis in accordance with position movement of the coupler first member 10. There are many well known prior art servo drive devices that would be suitable for this purpose. The motor 130 and pot 132 are connected mechanically so the position of the shaft in both the motor and the pot is proportional to one of the position voltage signals from the position sensor 16. A tachometer feedback from potentiometer 134 has been provided by feeding forward a part of the motor armature current. This has been set so that DC resistance drop across the motor 130 is cancelled and the back EMF which is proportional to the motor speed enters the loop proportionately and with a negative sign. The potentiometer 132 includes resistor 131, potentiometer 133 and potentiometer 135. The potentiometer 136 provides desired gain adjustment, the potentiometer 138 establishes the range of travel distance along a given axis and a potentiometer 135 provides any position offset that may be required. The following component values were employed to make an actual embodiment of the servo control apparatus as shown in FIG. 5.

| Motor 130 | ¼ watt - Precision DC Servo Motor |
|---|---|
| Resistor 131 | 1K ohms |
| Potentiometer 133 | 1K ohms |
| Potentiometer 134 | 10K ohms |
| Potentiometer 135 | 2K ohms |
| Potentiometer 136 | 500K ohms |
| Potentiometer 138 | 20K ohms |
| Resistor 140 | 10K ohms |
| Differential Amplifier 142 | National Semiconductor LH0041 |

I claim:

1. In an apparatus for displaying the position of a movable first member relative to the position of a second member and operative with a position sensor for providing a plurality of signals in accordance with three respective cartesian coordinates of the relative separation between the first member and the second member, the combination of:
    means providing a first image in accordance with the position of the first member, and
    means providing a second image in accordance with the position of the second member,
    with said first image providing means being movable and including a first screen having a reticule and cooperative with an iris member responsive to a first of said signals for projecting a first image and including first drive means responsive to a second of said signals for moving the first image along one of said coordinates and second drive means responsive to a third of said signals for moving the first image along another of said coordinates.

2. The apparatus of claim 1, with said first image providing means including third drive means responsive to said first of said signals for adjusting said iris member to determine the size of said first image.

3. The apparatus of claim 1, with said first image being moved along said one coordinate in accordance with any movement of the first member along said one coordinate and with said first image being moved along said another coordinate in accordance with any movement of the first member along said another coordinate.

4. The apparatus of claim 1, with said first image providing means including third drive means responsive to said first of said signals and operative with said iris member for determining the size of the first image in accordance with any movement of the first member along a third of said coordinates.

5. In apparatus for indicating the movable position of a first member in relation to the fixed position of a second member and responsive to a plurality of control signals provided in accordance with three cartesian coordinates of the first member position relative to the second member position, the combination of
    first means providing a movable image that follows the movable position of the first member for each of said three coordinates, and
    second means providing a fixed image representing the fixed position of the second member,
    with said first means including a first servo drive and a second servo drive and an aperture device that responds to a first of said control signals to determine the size of the movable image, with the first servo drive being operative with a second of said control signals for moving the aperture device to follow the position movement of the first member along a first of said coordinates and the second servo device being operative with a third of said control signals for moving the aperture device to follow the position movement of the first member along a second of said coordinates.

6. The apparatus of claim 5 with said aperture device having an adjustable opening and with said first means including said first servo drive operative with a third of said control signals for determining the size of said opening in accordance with the position movement of the first member along a third of said coordinates.

* * * * *